United States Patent [19]

Shang et al.

[11] Patent Number: 5,764,971
[45] Date of Patent: Jun. 9, 1998

[54] METHOD AND APPARATUS FOR IMPLEMENTING PRECISE INTERRUPTS IN A PIPELINED DATA PROCESSING SYSTEM

[75] Inventors: Shi-Sheng Shang, Kaohsiung; Shih-Yin Lin, Hsin-Chu; Ching-Tang Chang; Bing-Huang Huang, both of Taipei, all of Taiwan

[73] Assignee: Industrial Technology Research Institute, Taiwan

[21] Appl. No.: 763,670

[22] Filed: Dec. 11, 1996

[51] Int. Cl.$^6$ ................................................ G06F 9/46
[52] U.S. Cl. ................................ 395/591; 395/800.23
[58] Field of Search ............................ 395/591, 800.23

[56] References Cited

U.S. PATENT DOCUMENTS

| | | |
|---|---|---|
| 4,438,489 | 3/1984 | Heinrich et al. . |
| 5,075,844 | 12/1991 | Jardine et al. . |
| 5,109,381 | 4/1992 | Duxbury et al. . |
| 5,193,158 | 3/1993 | Kinney et al. . |
| 5,283,891 | 2/1994 | Suzuki et al. . |
| 5,307,504 | 4/1994 | Robinson et al. . |
| 5,325,536 | 6/1994 | Chang et al. . |
| 5,448,705 | 9/1995 | Nguyen et al. ............... 395/800.23 |
| 5,542,058 | 7/1996 | Brown, III et al. ................ 395/557 |
| 5,659,721 | 8/1997 | Shen et al. ........................ 395/569 |
| 5,687,338 | 11/1997 | Boggs et al. ..................... 395/381 |
| 5,692,170 | 11/1997 | Isaman ........................... 395/591 |

OTHER PUBLICATIONS

Walker, et al., "Interrupt Processing in Concurrent Processors," *IEEE*, 36–46 (Jun. 1995).
Smith, et al., "Implementing Precise Interrupts in Pipeland Processors," *IEEE*, 37:562–573 (May 1988).

*Primary Examiner*—William M. Treat
*Attorney, Agent, or Firm*—Fish & Richardson P.C.

[57] ABSTRACT

An apparatus for producing in a superscalar pipelined system out-of-order execution and in-order completion of a set of macroinstructions, wherein the set of macroinstructions are translated into a set of microinstructions and the microinstructions are executed by the pipelined system and wherein at least some of said macroinstructions translate into more than one microinstruction, the apparatus including a result completion register having a plurality of entry fields each of which is used to indicate a completion state of a different corresponding microinstruction among the set of microinstructions; an interrupt condition register having a plurality of entry fields each of which is used to specify an occurrence of an interrupt condition during fetching, decoding, and executing a corresponding microinstruction among the set of microinstructions; an instruction size register having a plurality of entry fields which are used to identify locations of boundaries between macroinstructions among the set of microinstructions; a priority encoder which receives input from the result completion register and the instruction size register and which during operation generates an output indicating when all of the microinstructions of a next-in-line macroinstruction have been executed; and a retirement controller which receives the output from the priority encoder and which during operation in response to the output of the priority encoder retires the next-in-line macroinstruction when said output indicates that all of the microinstructions of the next-in-line macroinstruction have been executed.

14 Claims, 9 Drawing Sheets

| Operation Type | Tag | Destination Register | Result (Address) | Interrupt Conditions | Valid | Instruction Size | Other |
|---|---|---|---|---|---|---|---|
| ...X | ...X | ...X | ...X | ...X | ...0 | ...X | ...X... |
| Y | 14 | Y | | | 1 | 4 | Y... |
| Y | 13 | Y | | | 1 | 0 | Y... |
| Y | 12 | Y | Z | 3 | 1 | 0 | Y... |
| Y | 11 | Y | | | 1 | 0 | Y... |
| Y | 10 | Y | | | 1 | 1 | Y... |
| Y | 9 | Y | Z | 3 | 1 | 3 | Y... |
| Y | 8 | Y | Z | 5 | 1 | 0 | Y... |
| Y | 7 | Y | | | 1 | 0 | Y... |
| Y | 6 | Y | Z | | 1 | 2 | Y... |
| Y | 5 | Y | | | 1 | 0 | Y... |
| X... | X... | X... | X... | X... | 0... | X... | X... |

50 — Operation Type, 52 — Tag, 54 — Destination Register, 56 — Result (Address), 58 — Interrupt Conditions, 60 — Valid, 62 — Instruction Size Tail ↑ 65

63 ↑ Head

METHOD AND APPARATUS FOR IMPLEMENTING PRECISE INTERRUPTS IN A PIPELINED DATA PROCESSING SYSTEM

BACKGROUND OF THE INVENTION

The invention relates generally to implementing precise interrupts in a superscalar processor architecture.

In general, a superscalar processor architecture is an architecture that can execute two or more scalar operations in parallel. The architecture implies multiple functional units, which may or may not be identical to each other. It also implies the likelihood of out-of-order execution of the scalar operations, i.e., executing a later instruction before the present instruction is executed. This requires that special measures be taken to avoid false data dependency problems and to make sure that interrupts are handled correctly, especially if precise interrupts are being supported.

When an interrupt occurs during process execution, the processor must stop the currently executing process to handle processing of the interrupt. Some state information about the process needs to be saved, unless the interrupted process encounters a catastrophic interrupt and is not able to resume. The state of an interrupted process is typically saved by the hardware, the software, or by a combination of the two. An interrupt is precise if the saved state is consistent with the sequential architectural model, in which an architectural program counter sequences through instructions one by one, finishing one before starting the next one. If the interrupt was caused by an instruction, the saved program counter points to that interrupting instruction, which must either be completely executed or completely unexecuted. With precise interrupts, the process state is serially correct before interrupt processing can start.

Figure 1:
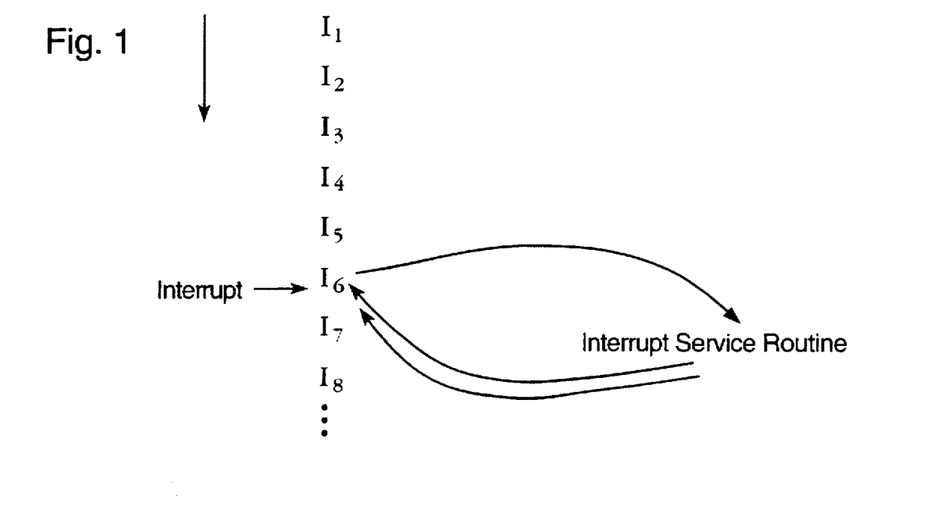
FIG. 1 illustrates precise interrupts in a scalar processor.

FIG. 1 illustrates precise interrupts in a scalar processor. The figure shows a sequence of instructions: I1, I2, . . . , I8 . . . An interrupt condition occurs during the execution of I6. At that point, the system branches to a fixed position in memory where an interrupt service routine (ISR) is stored and it executes that ISR. If the system supports precise interrupts, after handling the exception, the system must then go back to either reexecute I6 or execute the next instruction after I6, namely, I7.

The interrupt may occur part way through the execution of I6. Thus, where the system returns to depends on where the system was in its execution of I6 when the interrupt occurred and it depends on what kind of interrupt occurred and it depends on the instruction which experienced the exception condition. If it is not a serious exception condition, then it is possible to execute I6. If it is a serious exception condition, then it will not be possible to execute I6.

If the execution of I6 was completed and the system state was updated, then after handling the interrupt the system returns to execute the next instruction. If I6 did not affect any process state, then that usually implies that the system must reexecute I6.

Using techniques that are well known to persons skilled in the art, the hardware guarantees that the proper state information is retained and it determines whether the IRS returns to either the beginning of I6 or I7.

Pipelined processors offer significant performance benefits over the sequential computational model by simultaneously executing instructions at different stages. The processing of instructions in a pipelined processor breaks down into m distinct stages. Ideally, m instructions then can be simultaneously active in the processor at a given time, one in each of the m pipeline stages, giving a theoretical speedup of m over the sequential model. A pipelined processor with multiple functional units will create a situation in which instructions can complete out of order. For example, if the processor issues a complex instruction, followed immediately by a simple instruction, the simple instruction will complete before the complex instruction. This simple instruction then will update the contents of the register file before the complex instruction does. If the complex instruction causes an exception during execution, the register file will not agree with that of the sequential execution model. An instruction that issued after the instruction which could not complete because of the exception condition has modified the register file, causing the disagreement. The present invention solves this out-of-order completion problem by providing precise interrupts in a pipelined, e.g. superscalar, processor having multiple functional units.

SUMMARY OF THE INVENTION

The invention relates to a system in which variable length instructions (referred to hereinafter as macroinstructions) are translated into one or more fixed length microinstructions and then those microinstructions are executed on a superscalar processor including multiple functional units. The execution of the microinstructions on the superscalar processor must produce the same results as those which would be obtained by executing the macroinstructions on a scalar processor. And if precise interrupts are supported, this presents certain problems which need to be solved, one of which is the proper handling of intra-instruction interrupts.

Figure 2:
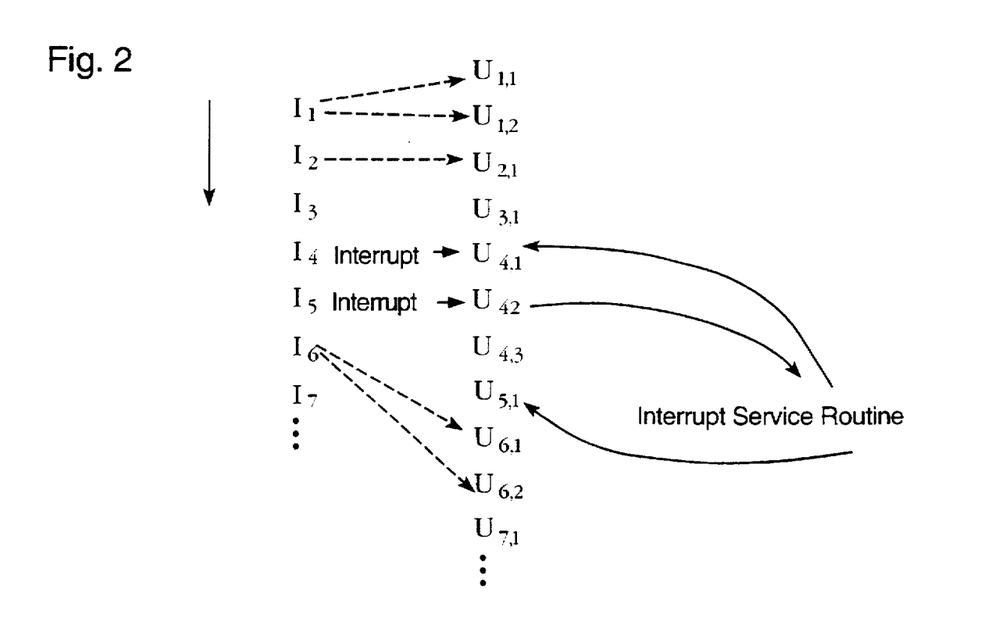
FIG. 2 illustrates intra-instruction interrupts which occur in executing microinstructions on a superscalar processor.

FIG. 2 illustrates the intra-instruction interrupt situation that can occur. In this case, the instructions of the sequence of (i.e., instructions $I_i$) are each translated into one or more microinstructions (i.e., $U_{i,j}$), which may be for example RISC-type instructions. The microinstructions $U_{i,j}$ are then executed. In the illustrated example an exception occurs during execution of $U_{4,1}$ and during the execution of $U_{4,2}$, which may have been executed before $U_{4,1}$. This is referred to as an intra-instruction interrupt situation. To support precise interrupts, the system must either return to reexecute microinstruction $U_{4,1}$ (i.e., the beginning of macroinstruction $I_4$) or go on to execute the next microinstruction $U_{5,1}$ (i.e., the beginning of macroinstruction $I_5$) after handling the interrupt. To do this correctly, the system needs to be aware of the boundaries of the macroinstructions and in needs to be aware of the occurrence of multiple interrupts among which an arbitration needs to be performed to decide which one takes precedence. As will be seen below, the boundaries are identified when the instructions are translated to microinstructions and this information is maintained in the storage apparatus. In addition, the interrupt conditions are logged so that they can be identified as to which macroinstructions they belong.

We have designed a storage apparatus for recording interrupt conditions resulting from issuing macroinstructions and executing microinstructions translated therefrom. The storage apparatus is designed to implement precise interrupts in a pipelined data processing system. In this system, we assume that the macroinstructions are first translated into simple, fixed-length instructions, called microinstructions, for execution on a RISC (reduced instruction set computer) core. These microinstructions are serially passed through and logged into a storage apparatus so that the boundaries of the macroinstructions from which they were derived are identified. Then they are executed by an execution engine, consisting of multiple functional units. As discussed above, executing each individual microinstruction may result in interrupt conditions. Considering the possibilities of encountering various types of interrupt conditions in the data processing system at the same time, our scheme makes it possible to implement precise interrupts while arbitrating among intra-instruction, system-status, and external interrupts.

In general, in one aspect, the invention is an apparatus for producing in a superscalar pipelined system out-of-order execution and in-order completion of a set of macroinstructions, wherein the set of macroinstructions are translated into a set of microinstructions and the microinstructions are executed by the pipelined system and wherein at least some of said macroinstructions translate into more than one microinstruction. The apparatus includes a result completion register having a plurality of sequentially arranged entry fields each of which is used to indicate a completion state of a different corresponding microinstruction among the set of microinstructions; an interrupt condition register having a plurality of sequentially arranged entry fields each of which is used to specify an occurrence of an interrupt condition during fetching, decoding, and executing a corresponding microinstruction among the set of microinstructions; an instruction size register having a plurality of sequentially arranged entry fields which are used to identify locations of boundaries between macroinstructions among the set of microinstructions; a priority encoder which receives input from the result completion register and the instruction size register and which during operation generates an output indicating when all of the microinstructions of a next-in-line macroinstruction have been executed; and a retirement controller which receives the output from the priority encoder and which during operation in response to the output of the priority encoder retires the next-in-line macroinstruction when said output indicates that all of the microinstructions of the next-in-line macroinstruction have been executed.

Preferred embodiments include the following features. The apparatus also includes a comparator which compares the output of the priority encoder with contents of a group of fields of the interrupt condition register and indicates to the retirement controller which of the microinstructions of the next-in-line macroinstruction have experienced an interrupt condition. The comparator includes a plurality of AND gates each of which includes a first input and a second input and an output, wherein the priority encoder includes a plurality of suboutputs on which the output of the priority encoder is generated and wherein each of said plurality of suboutputs is delivered to the first input of a different one of the plurality of AND gates and wherein each field of the group of fields within the interrupt condition register provides input to the second input of a different one of the plurality of AND gates, and wherein the output of each of the AND gates provides the indication of which of the microinstructions of the next-in-line macroinstruction have experienced an interrupt condition. The plurality of AND gates and the plurality of suboutputs are equal in number. More specifically, each of the plurality of macroinstructions translates into at most n microinstructions and the plurality of AND gates and the plurality of suboutputs are both equal in number to n. The retirement controller receives the interrupt conditions stored in the fields of the interrupt condition register corresponding to the next-in-line macroinstruction and the retirement controller receives indications of an occurrence of external interrupt conditions and internal system-status interrupt conditions and wherein the retirement controller arbitrates among all the interrupt conditions which are received by it to determine which interrupt condition will be processed first.

In general, in another aspect, the invention is a superscalar pipelined system which performs out-of-order execution and in-order completion of a plurality of macroinstructions. The pipelined system includes an instruction fetch and decode module which during operation fetches, decodes, and translates each of the macroinstructions of the plurality of macroinstructions into one or more microinstructions to thereby generate a plurality of microinstructions, wherein at least some of the macroinstructions translate into more than one microinstruction; a register file which provides records for storing results of executing the plurality of microinstructions which are generated by the instruction fetch and decode module; a storage apparatus which provides fields for logging the plurality of microinstructions which are generated by the instruction fetch and decode module; a plurality of functional units for executing the plurality of microinstructions; and an instruction window unit which during operation receives the plurality of microinstructions from the instruction fetch and decode module and dispatches them to the plurality of functional units for execution. The storage apparatus includes a result completion register, an interrupt condition register, an instruction size register, a priority encoder, and a retirement controller, as described above.

The invention provides a solution to the intra-instruction interrupt problem.

Other advantages and features will become apparent from the following description of the preferred embodiment and from the claims.

BRIEF DESCRIPTION OF THE DRAWINGS

FIGS. 5(a–e) present a block diagram of the relevant components of the storage apparatus and illustrate the operation thereof.

DESCRIPTION OF THE PREFERRED EMBODIMENTS

Figure 3:
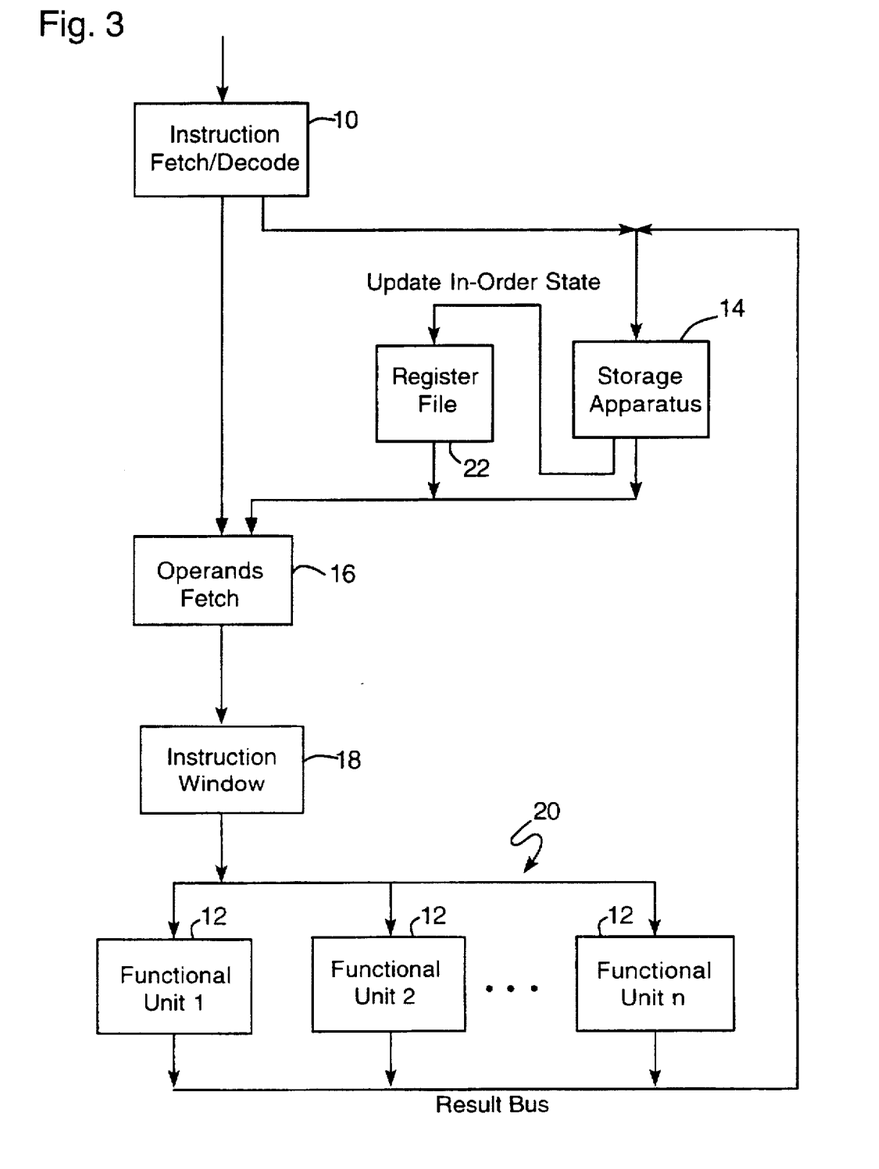
FIG. 3 shows a block diagram of a superscalar architecture which embodies the invention.

FIG. 3 shows a functional block diagram of a representative system that embodies the invention. In such a system, as represented by block 10, variable length macroinstructions, such as might be used in a CISC (Complex Instruction Set Computer) architecture, are fetched, decoded, and then translated into simple, fixed-length instructions, called microinstructions, for execution by an execution engine 20. The execution engine which may employ a RISC (i.e., Reduced Instruction Set Computer) core employs multiple functional units 12. In the described embodiment, more than one instruction may be translated at a time, and each instruction may be translated into one to several microinstructions.

The microinstructions are then serially passed through and logged into a storage apparatus for superscalar processing purposes. They are also passed to an operand fetch unit (block 16). The operand fetch unit gets data for instructions once the required operands are available.

As soon as a microinstruction has its data operands made available and it is logged into the storage apparatus 14, it is queued in an instruction window 18 where it awaits execution by an execution engine 20, which includes the multiple functional units 12. At the appropriate time, each of the microinstructions in the instruction window is dispatched to the execution engine. When the results are available from the execution engine, a message is sent back to the storage apparatus 14.

Results of executing the instructions are written back to the storage apparatus temporarily, then at the appropriate moment, the results are written to the register file 22, which may be implemented as regular registers. The register file stores the sequential/processor state of executing macroinstructions. The processor state includes the content in the register file and in the memory hierarchy.

Since multiple functional units are used, microinstructions may get executed and completed out of order. A microinstruction is eligible for retirement from the storage apparatus if all of the microinstructions belonging to the previous macroinstructions have been retired or are eligible to retire, and if the set of translated microinstructions for the macroinstruction to which the microinstruction belongs has also been completely executed.

Thus, the writing of results to the register file from the storage apparatus is done in correct sequential order to impose in-order completion, i.e., as if the macroinstructions had been executed in sequential order on a scalar processor. This is done to prevent another instruction from updating a result before all other instructions that are supposed to have used the old value. When the system updates the register file, it makes sure that the program counter has proceeded to the right point, i.e., no other instruction will be needing the result that is going to be replaced in the register file.

In the described embodiment, the instruction window is a centralized buffer from which microinstructions are scheduled for execution. Alternatively, it could be a distributed buffer, e.g. a separate instruction window for each functional unit. Or it could be a hybrid of both the centralized and the distributed structure, e.g. a separate instruction window for several, but not all, of the functional units.

As indicated, the storage apparatus stores speculative execution results before they are ready to retire to the register file and to update architectural states. Thus, when a microinstruction needs to fetch operands, the fetch routine first searches for the operand in the storage apparatus. Since the storage apparatus might have multiple copies of the same register, the fetch routine searches for the most recent one. If the system cannot find the operand in the storage apparatus, the system then checks the register file.

To resolve data dependencies that might occur among different microinstructions, e.g. Write-After-Read, a register renaming technique, such as is well known in the art, may be used. Such renaming techniques are used, for example, in Intel Pentium Pro microprocessors and in various commercially available RISC processors. Use of a register renaming technique provides the further advantage of increasing instruction level parallelism to thereby speed up execution of the program.

The general architecture which we are describing is sometimes referred to as a decoupled multi-issue architecture, which buffers intermediate results and allows out-of-order execution.

Interrupt conditions may occur while executing any individual microinstruction. The possible interrupt conditions are classified into two groups, namely, instruction related interrupts and non-instruction related interrupts. The instruction related interrupts come from three sources: fetching instructions, decoding instructions, and executing instructions. The non-instruction related interrupts come from two sources, namely, internal system-status (e.g. a trap bit that is set after an instruction) and external sources (e.g. I/O and timer interrupts).

Considering the possibilities of encountering various types of interrupt conditions in the data processing system at the same time, the described embodiment arbitrates not only intra-instruction interrupt conditions but also system-status and external interrupts. Higher priority can be given to interrupt events that demand immediate attention, and designers may prioritize them in advance.

Figure 4:
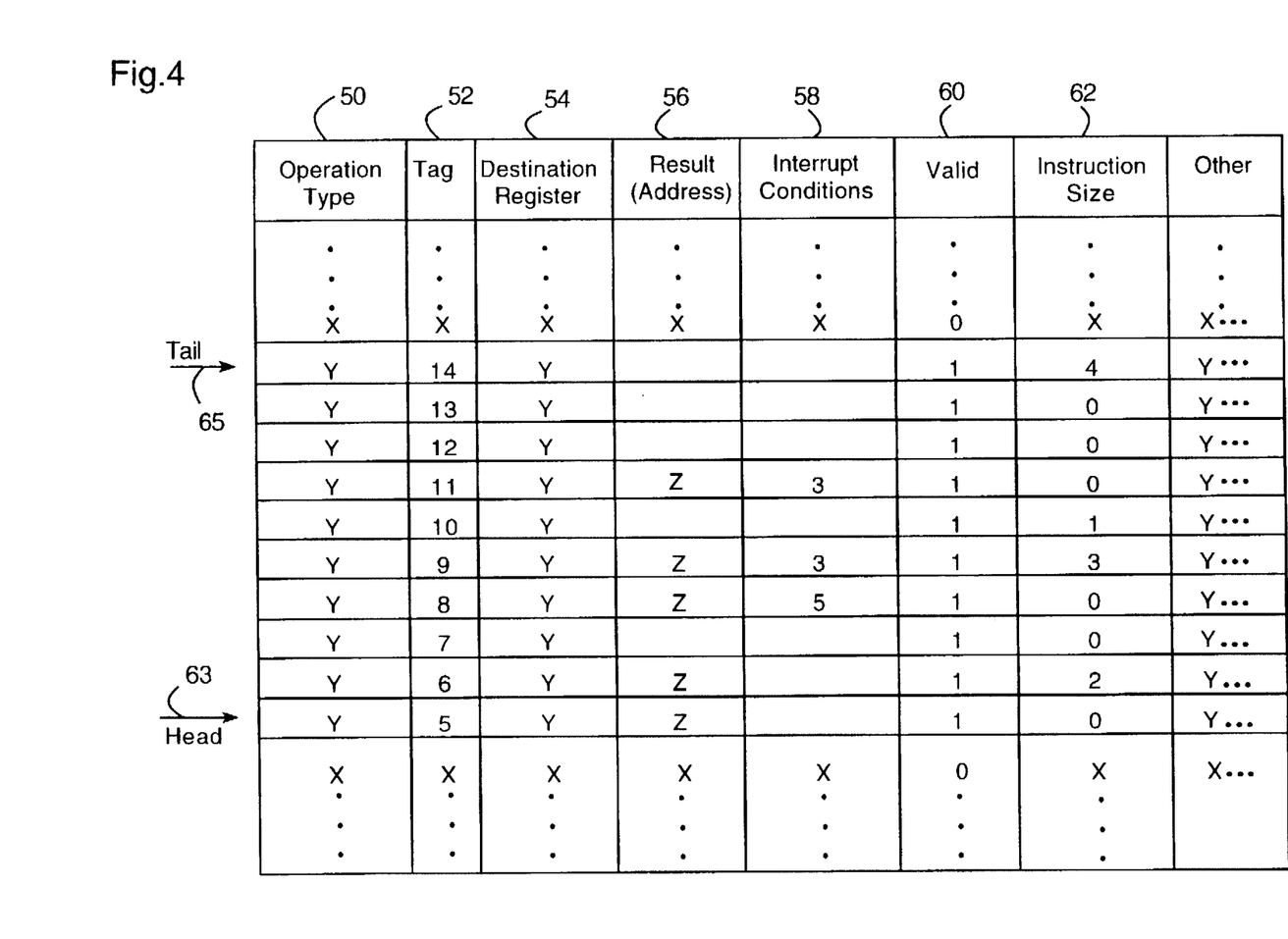
FIG. 4 shows an example of the information that is stored in the storage apparatus.

FIG. 4 illustrates the structure of the records that are stored in the storage apparatus. The memory for storing the records may be implemented by a circular list or a first-in-first-out (FIFO) buffer. Each microinstruction is logged into a record in the storage apparatus in the order in which it appears in the program and it is tagged to indicate its position relative to other microinstructions. The record includes fields for specifying an operation type 50, a tag 52, a destination register 54, an execution result/address 56, an interrupt condition 58, a valid bit 60, instruction size 62, and other information which is not particularly relevant to the invention described herein. The entries that are shown in FIG. 4 have the following meaning: X represents an entry the value of which does not matter; Y indicates that the field may or may not have data; and Z indicates that the execution of the microinstruction was completed.

The operation type field may be used to identify certain operations, e.g. loads, stores, and branches, which may require special handling. The destination register field stores the name of the register in the register file to which the contents of this record will be stored when the program counter proceeds to this point. As indicated above, some type of renaming technique may be used to name the destination register. The tag field identifies the instruction and is used to locate that instruction at a later time when the execution results are available.

Also note that the contents in the destination register associated with each macroinstruction may or may not be stored back to the register file. It depends on the specific type of microinstruction.

A head pointer 63 points to the location in the storage apparatus where the logged data of the first valid microinstruction is currently placed. And a tail pointer 65 points to the last valid microinstruction has been placed. In other words, when a macroinstruction is translated into several microinstructions after decoding, each microinstruction is serially logged into the storage apparatus after the location of a tail pointer and then the tail pointer is moved to the location of the last added microinstruction. When microinstructions are retired from the storage apparatus, as will be described shortly, they are removed in sequential order starting at the head pointer. Though two pointers are used in the storage apparatus, it does not mean that two must be used in hardware. A First-in-First-Out (FIFO) buffer may also be used to accomplish the same thing.

After a microinstruction is logged into the storage apparatus, its valid bit is set, its result and interrupt condition fields are cleared, its instruction size is set to either zero or the length of the macroinstruction (in terms of bytes). If the microinstruction is the last translated microinstruction for a macroinstruction, then the entry is set to the length of the microinstruction. Otherwise, the entry is set to zero.

Note that in FIG. 4, the valid bits in entries between head and tail pointers 63 and 65 (inclusively) are set to 1; and the other valid bits are set to invalid, thereby indicating which the entries in the storage apparatus contain valid data. In this case, entries with tags 5 through 14 represent valid microinstructions. The first two microinstructions, i.e., those tagged 5 and 6, represent two translated microinstructions corresponding to a macroinstruction with an instruction length of 2 bytes. It should be further noted that in this case the length of the macroinstruction is indicated as two, which also happens to be equal to the number of translated microinstructions for that macroinstruction. In practice, these two numbers need not agree.

When a microinstruction has its data operands ready, the instruction window dispatches it to a functional unit for execution. Then, the instruction window monitors the result buses and when it detects that the data is ready and the tag matches the tag in the microinstruction, it fetches the completion result. The completion result and interrupt conditions, if any, are at the same time written back to the storage apparatus by using the tag to locate the correct entry within the storage apparatus.

As shown in the example of FIG. 4, microinstructions corresponding to entries 8, 9, and 11 are completely executed, each with an interrupt condition recorded. Whereas, microinstructions corresponding to entries with tag values of 5 and 6 have been completely executed without any interrupt conditions. Microinstructions corresponding to entries with tag values of 7, 10, 12 through 14, have not completed yet.

In general, note that a non-empty interrupt condition field indicates that an interrupt condition was encountered during execution. The numbers, e.g. 3 and 5, identify which interrupt or exception condition had occurred. The numbers that are used in this example are merely illustrative. The choice and meaning of the numbers, of course, are implementation-dependent and are up to the designer. For interrupt conditions detected prior to execution, such as instruction-fetch page faults "at fetching" or unimplemented instructions "at decoding", they are logged into the storage apparatus and further instruction fetching or decoding is halted.

Example of the Operation of the Storage Apparatus

An example of the operation of the storage apparatus will help to further explain the invention. In this example which is illustrated with the help of FIGS. 5a–e, it is assumed that only one macroinstruction is to be retired at a time. It should be understood, however, that in more advanced designs it is possible to allow more than one macroinstruction to be retired at a time but the same principles as will be described below apply.

In our example, we assume that one macroinstruction translates into one to five microinstructions. This limitation in size is chosen merely for illustrative purposes, however. In some existing processors (e.g. Intel x86 processors), one CISC instruction might actually translate into five or more microinstructions and it should be understood that the invention is equally applicable to those other architectures as well.

Also in this particular embodiment, the storage apparatus is implemented in part by a first-in-first-out (FIFO) memory. When new information is logged into the storage apparatus, it is entered at the top of the memory and when an instruction is completed (i.e., all corresponding microinstructions are executed), it is taken out of the bottom of the memory.

Figure 5A:
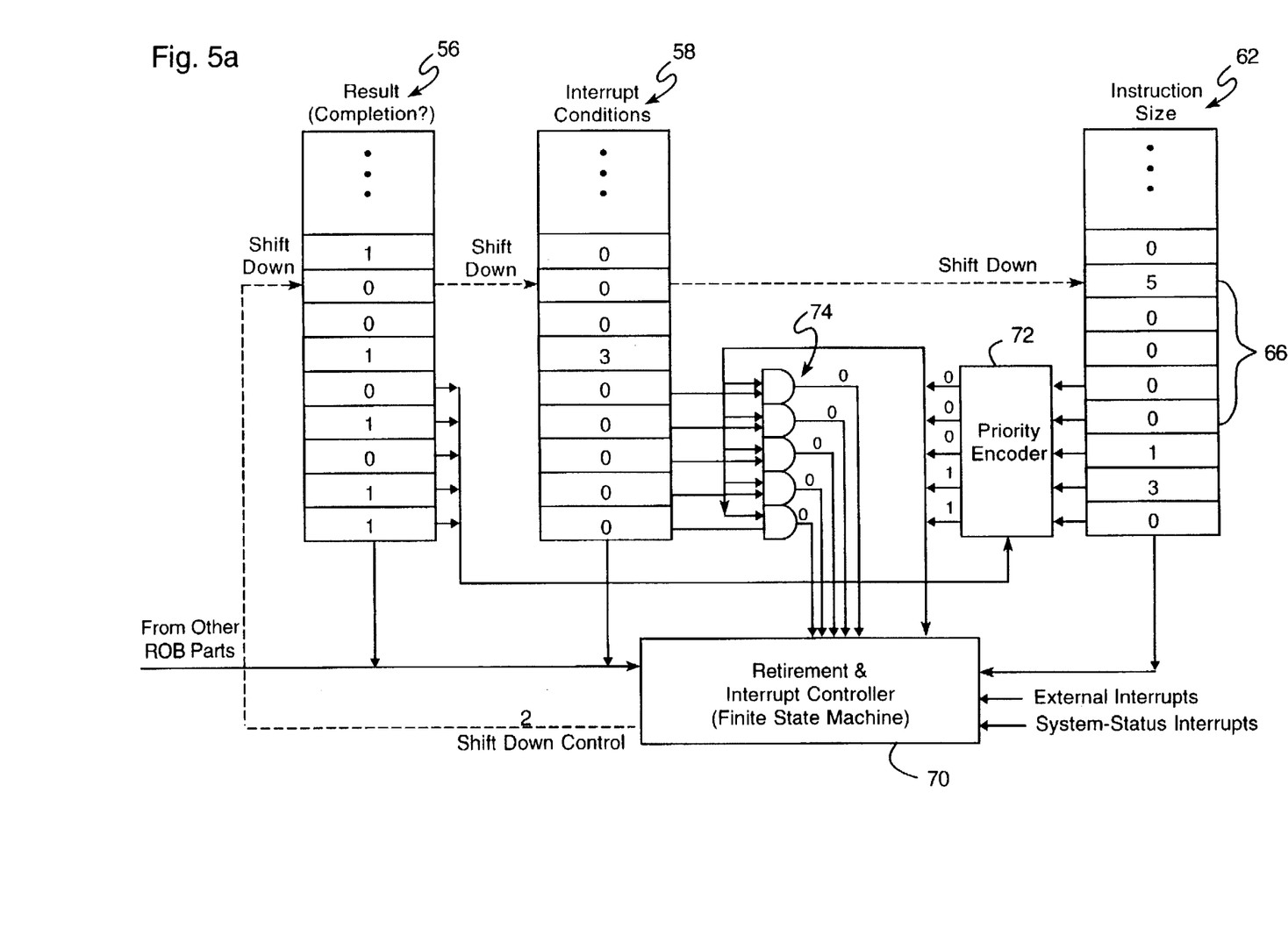

FIG. 5a shows the overall organization of storage apparatus. There are three key fields (or registers) in the storage apparatus that are of particular relevance. As indicated above, it should be understood that there are other fields, possibly many other fields, which are not being shown, including, for example, those fields illustrated in FIG. 3. The other fields, though they are important for other aspects of operation of the system, are not particularly relevant to the invention described herein.

The fields shown in FIGS. 5a are used specifically for supporting precise interrupts. For each record, there is a result completion field 56, an interrupt conditions field 58, and an instruction size field 62.

The result completion field 56 is used to indicate whether instruction execution has completed. When the result is available it is logged into this field. In this particular example, zero means not completed and one means completed.

The interrupt condition field 58 identifies the type of interrupt that occurred during the execution of the instruction. A zero means no interrupt condition and other numbers identify the particular type of interrupt which occurred. As indicated earlier, there are three types of interrupts that can occur other than system interrupts and external interrupts. These interrupts are logged into this field. The numbering convention for identifying the exception condition which occurred is implementation dependent and is not important to the principles described here. The external and system interrupts are not logged in but are handled by the storage apparatus differently.

The instruction size field 62 identifies the boundaries between macroinstructions. Each macroinstruction is translated into one or more microinstructions and these microinstructions are logged in sequential order into the storage apparatus. Each microinstruction of a group representing a single macroinstruction, except the last microinstruction of the group, is identified by a zero entry in the instruction size register. The last microinstruction of a group is identified by the length of the macroinstruction.

An example of how the instruction size field is used is shown in FIG. 5a. In this example, one of the macroinstructions translated into five microinstructions. These five microinstructions are identified in the instruction size register at location labeled 66. Note that the first four microinstructions are identified by zero in the instruction size field and the last microinstruction is identified by 5 entered into the instruction size field (assuming that the macroinstruction is 5 bytes in length). That is, the non-zero entry marks the boundary between that macroinstruction and the next one. Whereas, a zero entry means that the microinstruction belongs to the group of microinstructions identified by the next nonzero number above it.

Note that, depending upon the implementation, it may not be necessary to store any numbers other than ones and zeros in the instruction size field. In other words, distinguishing macroinstruction boundaries is mandatory but specifying the length of a macroinstruction may not be.

The set of like fields for multiple records can be viewed as a registers and thus they will be described as such below. But it should be understood that the use of the term is not meant to imply that there is necessarily a separate memory for each field.

The storage apparatus also includes a controller 70 which determines when a set of microinstructions is ready to be retired and it implements the rules for arbitrating among any interrupts that have been logged for those microinstructions. A macroinstruction is ready for retirement if the results for all of its microinstructions are completed and if the program counter points to the position just before that instruction. In addition to handling the interrupts that are logged into the interrupt condition register, the controller also receives and handles the external and system interrupts. In other words, the controller arbitrates among the five sources of interrupts to determine which interrupt is to be processed first. It then branches to the appropriate ISR for handling the interrupt. The details of the arbitration rules are implementation dependent and can be readily derived by persons skilled in the art for the particular processor architecture of relevance.

Within the storage apparatus, a priority encoder 72 receives input from both the result register and the instruction size register and performs at least two important functions. First, it identifies the number of entries in the registers that correspond to the next macroinstruction, i.e., the number of microinstructions in the next instruction. Second, it determines and indicates when the group of microinstructions for the next macroinstruction is ready for retirement.

The priority encoder has five output lines each of which goes to the controller 70 and to an input of a corresponding one of five gates of an gate AND gate array 74. Each of the AND gates of the array 74 also takes as its other input the signal stored in a corresponding one of the first five memory locations of the interrupt conditions register 58. The AND gate array 74 determines whether there are any interrupt conditions that are logged in the interrupt conditions register 58 for the next instruction and sends this information to the controller 70.

In essence, the priority encoder 72 causes the AND gate array 74 to look at as many memory locations of the interrupt conditions register 58 as correspond to the next macroinstruction in line for retirement. That is, the priority encoder 72 defines a window into the interrupt condition register and the size of that window is equal to the number of microinstructions in the macroinstruction that is at the head of the storage apparatus.

To explain the operation of the storage apparatus, we will refer to FIGS. 5a–e. In the scenario illustrated in FIG. 5a, the microinstructions for three translated macroinstructions are shown. The first macroinstruction that is in line for retirement includes two microinstructions, the second macroinstruction includes one microinstruction, and the third macroinstruction includes five microinstructions. As indicated by the contents of the result register, five microinstructions have been fully executed thus far. Both of the microinstructions for the next instruction in line for retirement have been completed and their results have been logged in the storage apparatus. Thus, that instruction is ready for retirement.

According to the interrupt conditions register 58, no exceptions were logged for those two microinstructions. And it is further assumed that at this time no external or system interrupts have occurred. The priority encoder, which receives input from both the instruction size register 62 and the result completion register 56, asserts a one (or high signal) on the first two of its output lines and it asserts a zero (or low signal) on the remainder of its output lines. The two ones indicate that the next macroinstruction in line for retirement includes the first two microinstructions and that they are both completely executed. In other words, the priority encoder asserts a one on the appropriate number output lines only if all microinstructions for the next macroinstruction are completed.

The low signals from the priority encoder 72 force the output of the corresponding gates in the AND gate array 74 to zero. The high signals cause the corresponding gates of the AND gate array 74 to test for non-zero entries in the first two memory locations of the interrupt conditions register 58 and to output a high signal for each of the memory locations that stores a non-zero value thereby indicating a stored interrupt condition.

Since the priority encoder 72 has notified the controller that the two microinstructions for the next instruction are completed and there were no logged interrupt conditions or other interrupt conditions, the two entries in the storage apparatus will be read out by the controller and subsequently their contents are used to update the processor state stored in the register file 22 (see FIG. 3) and memory hierarchy.

Figure 5B:
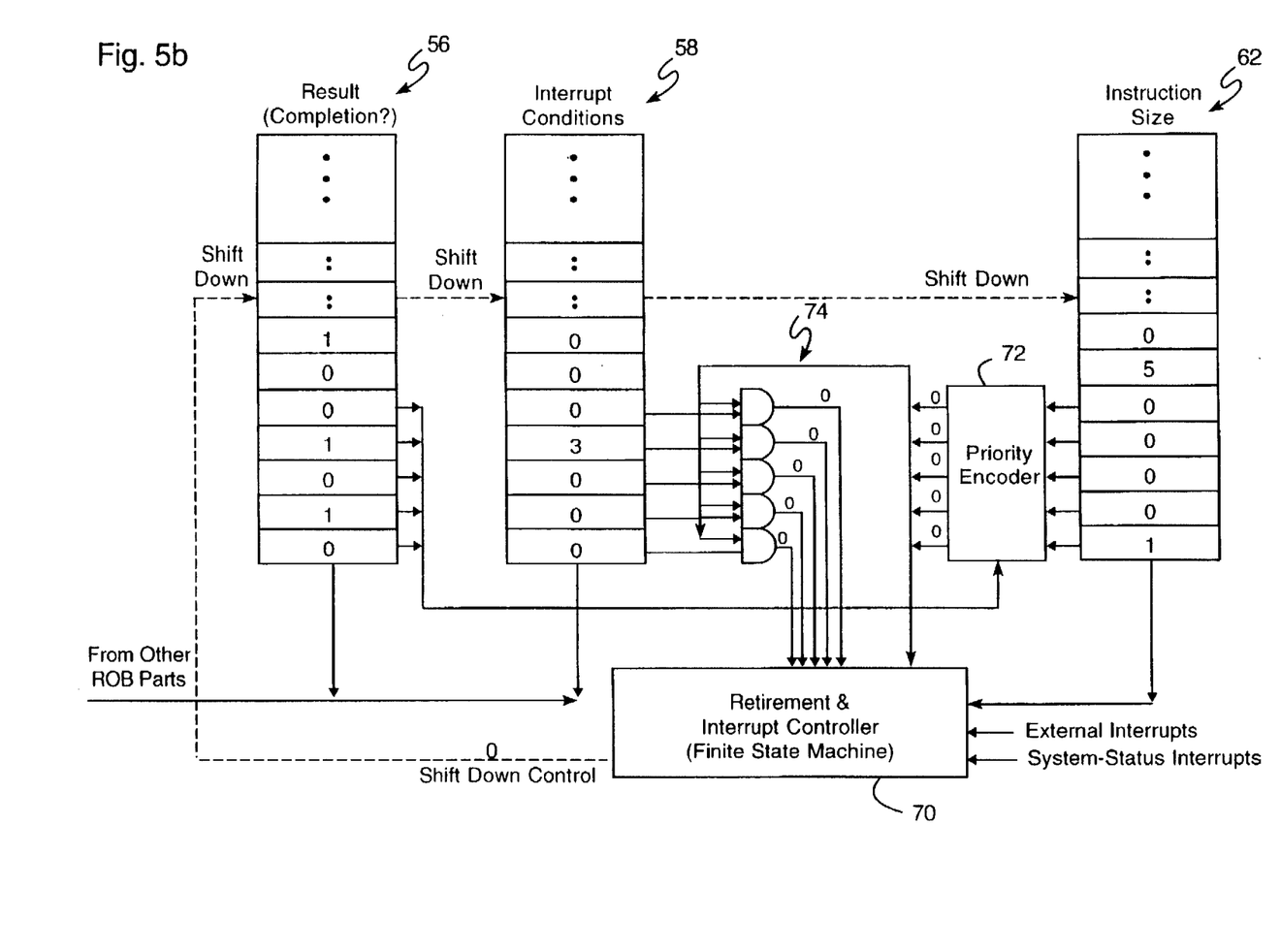

Referring now to FIG. 5b, the next macroinstruction that is in line for retirement is one microinstruction long and it has not yet been completed, as indicated by the zero stored in the first entry of the result completion register 56. Thus, the next instruction is not ready for retirement. Since not all of the microinstructions for the next instruction are completed, the priority encoder 72 outputs all zeroes on its output lines.

Figure 5C:
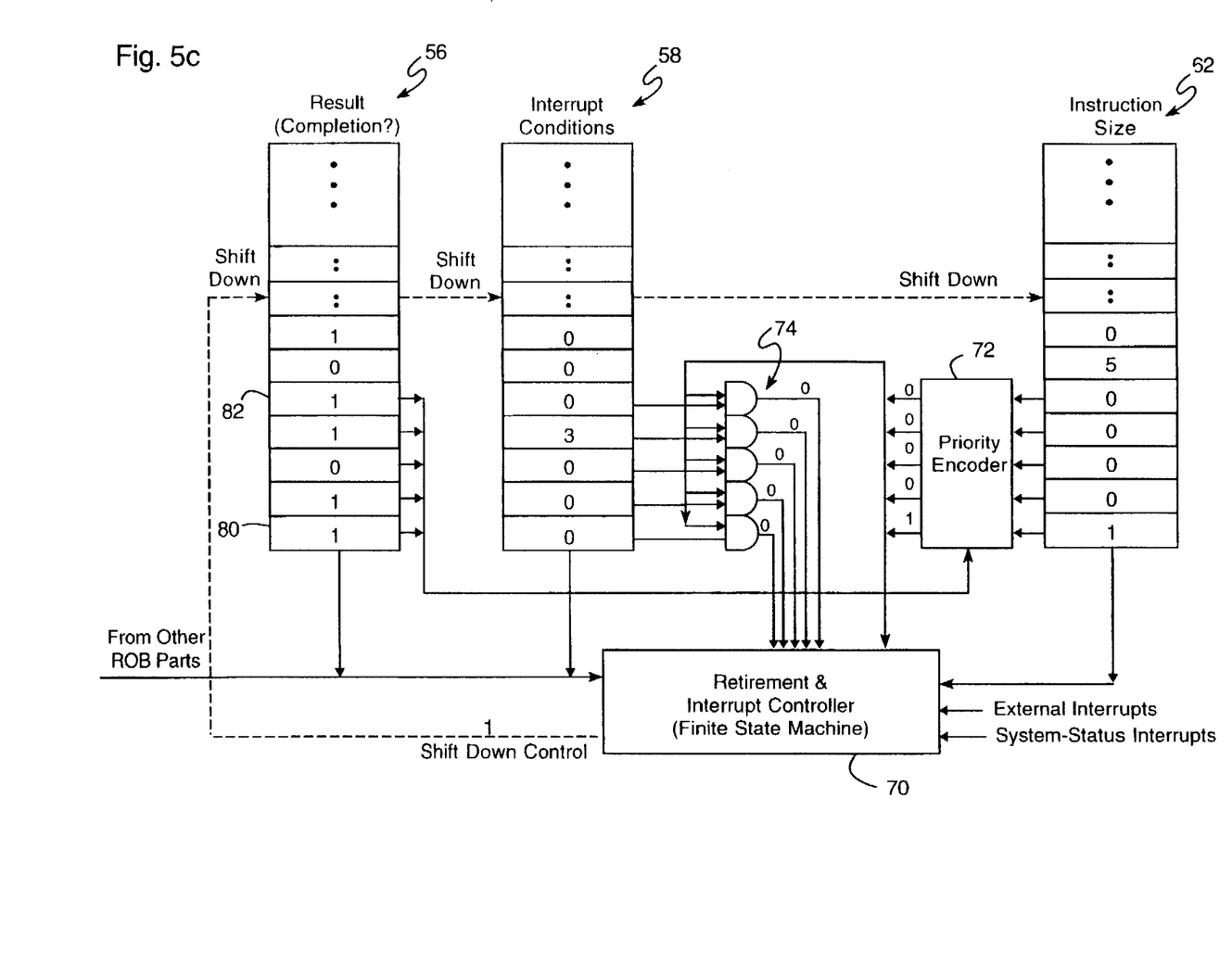

As shown in FIG. 5c, two more microinstructions, identified by reference numbers 80 and 82 (including the first microinstruction in the storage apparatus), have now been completed without any interrupt conditions. Since the priority encoder 72 now senses that the single microinstruction for the next-in-line macroinstruction is ready for retirement, it outputs a one on its first output line. This causes the AND gate array 74 to check for any logged interrupt conditions in the first entry of the interrupt conditions register 58 and it causes the controller 70 to generate a shift-down-by-one control signal. Since there were no logged interrupts (and, it is assumed, no system or eternal interrupts), the shift down by one signal is generated. Thus, the results of the completed macroinstruction are used by the controller to update the processor state stored in the register file and memory.

Figure 5D:
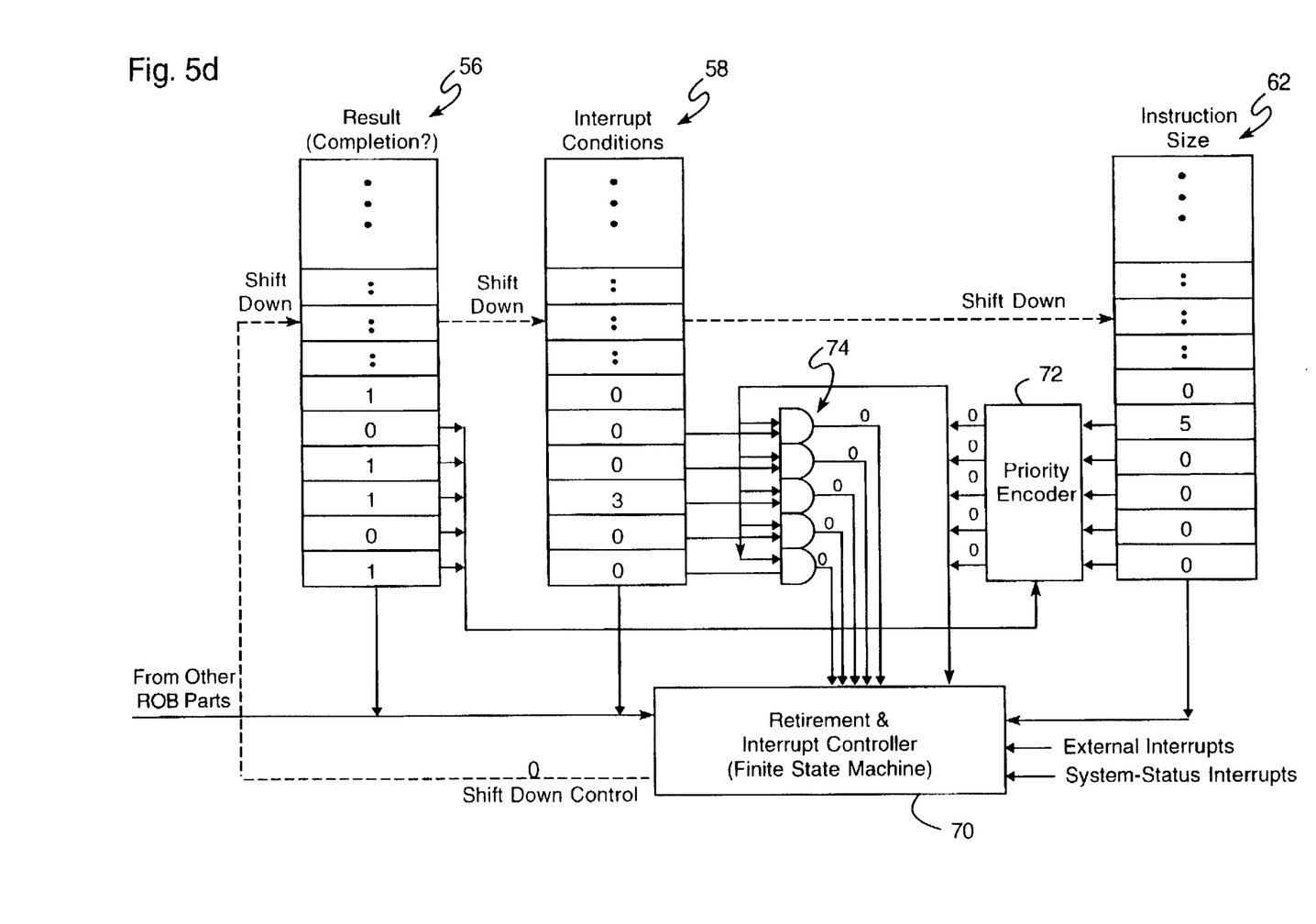

Now referring to FIG. 5d, the next macroinstruction that is in line for retirement contains five microinstructions, only three of which have been completely executed. Since two of the microinstructions are not yet completed, the output on all of the priority encoder output lines remains zero. Since the instruction is not ready for retirement, the controller 70 waits until it is.

Figure 5E:
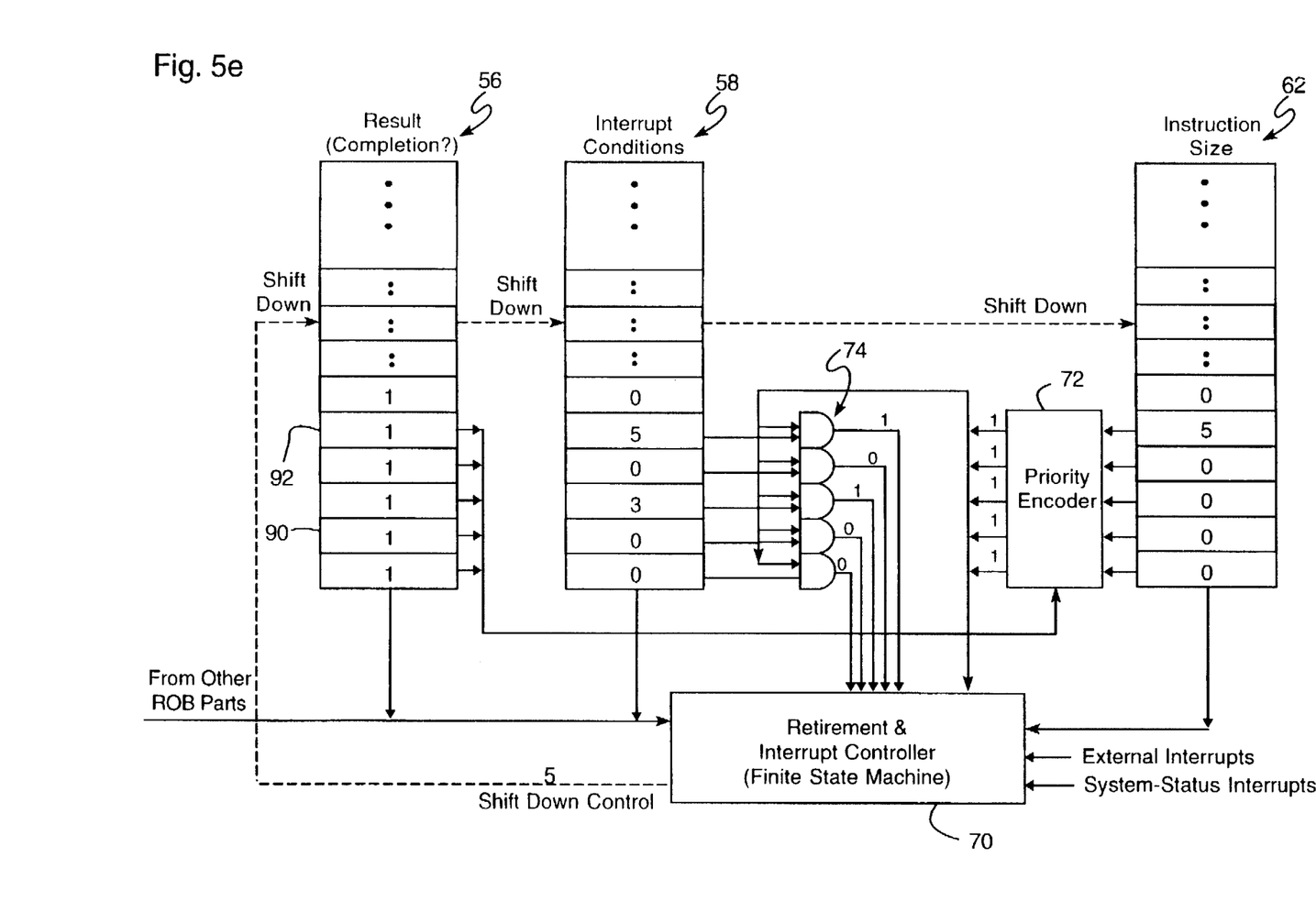

Referring to FIG. 5e, by this time the other two instructions 90 and 92 have been executed and the results have been logged into the appropriate fields in the result completion register. Note that microinstruction 92 completed with an interrupt condition 5 recorded. Since all of the microinstructions are now completed for the next macroinstruction that is in line for retirement, the priority encoder 72 generates ones on its five output lines, one for each microinstruction of the macroinstruction. These signals cause each of the five AND gates to test the contents of the first five locations in the interrupt conditions register 58 and indicate which locations, if any, contain logged exception conditions. In this case, the third and fifth microinstruction experienced exception conditions which were logged.

Since the five output lines of the priority encoder are high, the controller generates a shift-down-by-five control command to shift out the results for that macroinstruction into the controller. The controller then processes the interrupt conditions that were logged in those registers.

If there are multiple interrupts, as is the case in this example, the controller arbitrates among them to determine which interrupt will be processed first. The precise details of the arbitration are dependent upon the design of the processor and are readily determined by persons skilled in the art.

Figure 6:
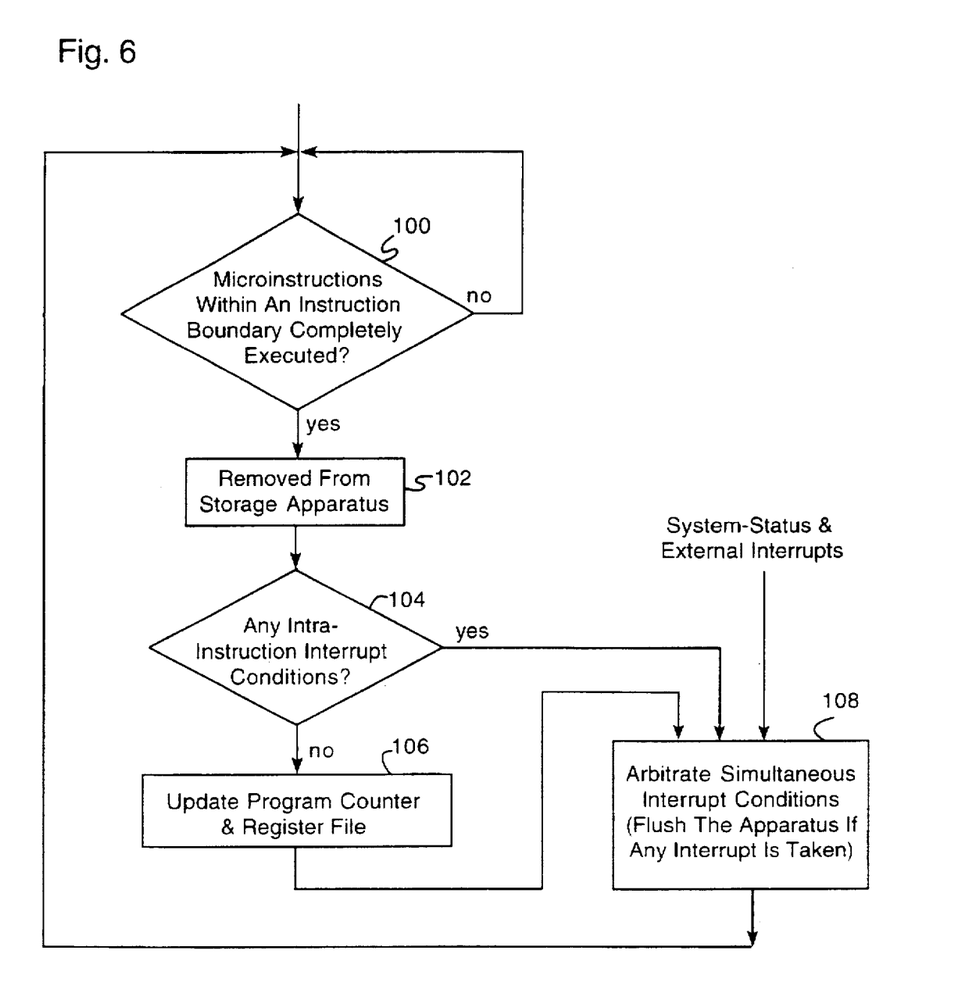
FIG. 6 shows a flow chart of the operation of the controller.

The basic operation of the controller is shown in FIG. 6. First, the controller checks whether all of the microinstructions for the next in line macroinstruction are completed (step 100). If they are not all complete, then it waits until they are. When it detects that they are completed, the controller removes those microinstructions from the storage apparatus by a shift down operation (step 102). Then, the controller checks whether any intra-instruction interrupts occurred (step 104). If there is no interrupt condition recorded in the entries which are being retired, the controller updates the register file, which stores in-order state, by writing the speculative execution results into the registers; it updates the program counter by incrementing it by the instruction size or by setting it to a target location which is logged into the storage apparatus if the instruction is a branch; and then it proceeds with arbitrating external and internal system-status interrupts, if any (step 106).

In step 104, if it was determined that interrupt conditions had been logged for any of the microinstructions, the controller does not update either the program counter or the register file, but rather it proceeds directly to processing the interrupt condition(s). If multiple exceptions had been logged or if system and/or external interrupts have occurred, the controller arbitrates among the multiple interrupt conditions to determine which one takes priority (step 108). Depending on which interrupt is taken, the program counter and the in-order state may or may not be updated. When an interrupt is taken, the storage apparatus is flushed and the corresponding interrupt service routine is fetched, decoded, and executed. In this manner, precise interrupts can be implemented.

As a consequence of arbitration, the controller may be able to update the program counter and the register file if the interrupt condition was not severe. However, if the interrupt condition was severe, it will not be possible to update either the program counter or the register file and the instruction will have to be executed again.

All interrupts, when taken, require that the storage apparatus be flushed of its contents. This is done because that information is no linger needed since the system must now execute the ISR. When the execution of the ISR is complete, the system again starts to execute the program from an appropriate particular location in the program. That is, it starts the instruction fetch and decode at one of two locations, either at the macroinstruction that experienced the interrupt condition or the next macroinstruction.

In the above-described design, the variable length macroinstructions translated into a variable number of microinstructions. This need not be the case. It is also possible that all macroinstructions would translate into a fixed number of microinstructions. Indeed, the invention is useful in systems in which one set of microinstructions translates into a different set of microinstructions.

Also note that in certain cases a macroinstruction may be translated into more than n microinstructions, where n specifies the maximum number of microinstructions that can be retired as an atomic unit. For example, certain "repeat" instructions/prefixes in Intel x86 processors, such as string moves, require iterative string move operations that may demand hundreds of processor cycles. And the atomic unit of microinstructions ready for retirement includes only those contained in an iteration. Other complex macroinstructions may be translated into several, possibly variable-sized, atomic groups of microinstructions.

Furthermore, the maximum permissible number of microinstructions conatined in an atomic group determines the minimum number of AND gates that are used for retirement control. The more AND gates there are, the more likely it is that more than one macroinstruction can be retired at one time. Indeed, it is possible and advantageous to retire more than one macroinstruction at a time (as long as the combined number of micrinstructioins does not exceed n) to improve preocessor execution throughput (perfromance) by modifying the priority encoder. Since it will often be the case that many macroinstructions will not translated into n microinstructions, if the total number of microinstructions resulting from two or more translated macroinstructions is less than or equal to n, then it is advantageous to retire all of them at the same time. This assumes, of course, that they are completely executed and are eligible for retirement. And it should also be understood that the cost of being able to do so is a more complicated and costly priority encoder design. Note that the best performance is achieved when the priority encoder is able to identify the largest number of next-in-line ready for retirement macroinstructions every time, so as to retire as many macroinstructions at a time to fully utilize the update capability of the retirement mechanism provided by the underlying hardware.

Other embodiments are within the following claims.

What is claimed is:

1. An apparatus for producing in a superscalar pipelined system out-of-order execution and in-order completion of a set of macroinstructions, wherein the set of macroinstructions are translated into a set of microinstructions and the microinstructions are executed by the pipelined system and wherein at least some of said macroinstructions translate into more than one microinstruction, the apparatus comprising:

a result completion register having a plurality of sequentially arranged entry fields each of which is used to indicate a completion state of a different corresponding microinstruction among the set of microinstructions;

an interrupt condition register having a plurality of sequentially arranged entry fields each of which is used to specify an occurrence of an interrupt condition during fetching, decoding, and executing a corresponding microinstruction among the set of microinstructions;

an instruction size register having a plurality of sequentially arranged entry fields which are used to identify locations of boundaries between macroinstructions among the set of microinstructions;

a priority encoder which receives input from the result completion register and the instruction size register and which during operation generates an output indicating when all of the microinstructions of a next-in-line macroinstruction have been executed; and a retirement controller which receives the output from the priority encoder and which during operation in response to the output of the priority encoder retires the next-in-line macroinstruction when said output indicates that all of the microinstructions of the next-in-line macroinstruction have been executed.

2. The apparatus of claim 1 further comprising a comparator which compares the output of the priority encoder with contents of a group of fields of the interrupt condition register and indicates to the retirement controller which of the microinstructions of the next-in-line macroinstruction have experienced an interrupt condition.

3. The apparatus of claim 2 wherein the comparator comprises a plurality of AND gates each of which includes a first input and a second input and an output, wherein the priority encoder includes a plurality of suboutputs on which the priority encoder output is generated and wherein each of said plurality of suboutputs is delivered to the first input of a different one of the plurality of AND gates and wherein each field of the group of fields within the interrupt condition register provides input to the second input of a different one of the plurality of AND gates, and wherein the output of each of the AND gates provides the indication of which of the microinstructions of the next-in-line macroinstruction have experienced an interrupt condition.

4. The apparatus of claim 3 wherein the plurality of AND gates and the plurality of suboutputs are equal in number.

5. The apparatus of claim 4 wherein each of the plurality of macroinstructions translates into at most n microinstructions and wherein the plurality of AND gates and the plurality of suboutputs are both equal in number to n.

6. The apparatus of claim 3 wherein the retirement controller receives the interrupt conditions stored in the fields of the interrupt condition register corresponding to the next-in-line macroinstruction and the retirement controller receives indications of an occurrence of external interrupt conditions and internal system-status interrupt conditions and wherein the retirement controller arbitrates among all the interrupts conditions which are received by it to determine which interrupt condition will be processed first.

7. A superscalar pipelined system which performs out-of-order execution and in-order completion of a plurality of macroinstructions, the pipelined system comprising:

an instruction fetch and decode module which during operation fetches, decodes, and translates each of the macroinstructions of the plurality of macroinstructions into one or more microinstructions to thereby generate a plurality of microinstructions, wherein at least some of the macroinstructions translate into more than one microinstruction;

a register file which provides records for storing results of executing the plurality of microinstructions which are generated by the instruction fetch and decode module;

a storage apparatus which provides fields for logging the plurality of microinstructions which are generated by the instruction fetch and decode module;

a plurality of functional units for executing the plurality of microinstructions; and an instruction window unit which during operation receives the plurality of microinstructions from the instruction fetch and decode module and dispatches them to the plurality of functional units for execution, wherein the storage apparatus comprises:

a result completion register having a plurality of sequentially arranged entry fields each of which is used to indicate a completion state of a different corresponding microinstruction among the plurality of microinstructions;

an interrupt condition register having a plurality of sequentially arranged entry fields each of which is used to specify an occurrence of an interrupt condition during fetching, decoding, and executing a corresponding microinstruction among the plurality of microinstructions;

an instruction size register having a plurality of sequentially arranged entry fields which are used to identify locations of boundaries between macroinstructions among the plurality of microinstructions;

a priority encoder which receives input from the result completion register and the instruction size register and which during operation generates an output indicating when all of the microinstructions of a next-in-line macroinstruction have been executed; and a retirement controller which receives the output from the priority encoder and which during operation in response to the output of the priority encoder retires the next-in-line macroinstruction to update processor state stored the register file and a memory hierarchy when said output indicates that all of the microinstructions of the next-in-line macroinstruction have been executed.

8. The apparatus of claim 7 further comprising a comparator which compares the output of the priority encoder with contents of a group of fields of the interrupt condition register and indicates to the retirement controller which of the microinstructions of the next-in-line macroinstruction have experienced an interrupt condition.

9. The apparatus of claim 8 wherein the comparator comprises a plurality of AND gates each of which includes a first input and a second input and an output, wherein the priority encoder includes a plurality of suboutputs on which the priority encoder output is generated and wherein each of said plurality of suboutputs is delivered to the first input of a different one of the plurality of AND gates and wherein each field of the group of fields within the interrupt condition register provides input to the second input of a different one of the plurality of AND gates, and wherein the output of each of the AND gates provides the indication of which of the microinstructions of the next-in-line macroinstruction have experienced an interrupt condition.

10. The apparatus of claim 9 wherein the plurality of AND gates and the plurality of suboutputs are equal in number.

11. The apparatus of claim 10 wherein each of the plurality of macroinstructions translates into at most n microinstructions and wherein the plurality of AND gates and the plurality of suboutputs are both equal in number to n.

12. The apparatus of claim 9 wherein the retirement controller receives the interrupt conditions stored in the fields of the interrupt condition register corresponding to the next-in-line macroinstruction and the retirement controller receives an indication of an occurrence of external interrupt conditions and/or internal system status interrupts and wherein the retirement controller arbitrates among all the interrupts conditions which are received by it to determine which interrupt condition will be processed first.

13. A method for achieving out-of-order execution and in order completion of a sequence of macroinstructions in a superscalar pipelined system that includes a plurality of functional units, wherein the sequence of macroinstructions are translated into a corresponding sequence of microinstructions, wherein at least some of said macroinstructions in the sequence of macroinstructions translate into two or more corresponding microinstructions in the sequence of microsintructions, the method comprising:

logging the microinstructions in sequential order in a register file;

indicating in said register file, when each of said microinstructions has been executed by the pipelined system;

logging into the register file occurrences of interrupt conditions for the microinstructions;

detecting when all of the microinstructions of a next-in-line macroinstruction are completed;

retiring the microinstructions of the next-in-line macroinstruction from the register file when it is detected that all of the microinstructions of a next-in-line macroinstruction are completed;

detecting whether any interrupt conditions have been logged in the register file for any of the microinstructions being retired; and if more than one interrupt condition is logged for the next-in-line macroinstruction, arbitrating among all simultaneously occurring interrupt conditions for the next-in-line macroinstruction to determine which interrupt condition will be handled first.

14. The method of claim 13 further comprising the steps of:

if no interrupt conditions are logged for the next-in-line macroinstruction, updating processor state;

checking whether any system status or external interrupt conditions have occurred; and if more than one system status or external interrupt conditions has occurred, arbitrating among the more than one system status or external interrupt conditions that have occurred to determine which system status and external interrupt condition will be handled first.

* * * * *